United States Patent [19]
Strand et al.

[11] Patent Number: 5,991,824
[45] Date of Patent: Nov. 23, 1999

[54] METHOD AND SYSTEM FOR SIMULTANEOUS HIGH BANDWIDTH INPUT OUTPUT

[75] Inventors: Bradley David Strand, Los Gatos; Patrick Delaney Ross, Sunnyvale; Dave Olson, Palo Alto, all of Calif.

[73] Assignee: Silicon Graphics, Inc., Mountain View, Calif.

[21] Appl. No.: 08/796,129

[22] Filed: Feb. 6, 1997

[51] Int. Cl.$^6$ ................................................. G06F 13/00
[52] U.S. Cl. ..................................... 710/1; 709/238
[58] Field of Search ........................... 395/800, 821, 395/888, 182.1, 680, 200.56, 847, 200.18, 500, 842; 370/389, 395–399, 400–425; 710/1; 709/8, 238, 234; 712/228

[56] References Cited

U.S. PATENT DOCUMENTS

| | | | |
|---|---|---|---|
| 5,193,204 | 3/1993 | Qureshi et al. | 395/800 |
| 5,291,482 | 3/1994 | Mcharg et al. | 370/60 |
| 5,333,298 | 7/1994 | Bland et al. | 395/500 |
| 5,524,250 | 6/1996 | Chesson et al. | 712/228 |
| 5,574,849 | 11/1996 | Sonnier et al. | 395/182.1 |
| 5,594,866 | 1/1997 | Nugent | 709/234 |
| 5,610,904 | 3/1997 | Eng et al. | 370/408 |
| 5,613,162 | 3/1997 | Kabenjian | 395/842 |
| 5,732,269 | 3/1998 | Compton et al. | 395/680 |
| 5,737,638 | 4/1998 | Byrn et al. | 395/888 |
| 5,774,660 | 6/1998 | Brendel | 395/200.31 |
| 5,774,744 | 6/1998 | Story et al. | 395/847 |
| 5,793,976 | 8/1998 | Chen et al. | 395/200.54 |
| 5,835,710 | 11/1998 | Nagami et al. | 395/200.8 |

*Primary Examiner*—Joseph E. Palys
*Assistant Examiner*—Rijue Mai
*Attorney, Agent, or Firm*—Wagner, Murabito & Hao LLP

[57] ABSTRACT

The present invention comprises a method and system for peer to peer input output. The present invention is implemented on a computer system having a microprocessor and a packet switched router coupled to the microprocessor. The peer to peer input output system of the present invention defines a data source corresponding to a first device coupled to the computer system. The system then defines a data sink corresponding to a second device coupled to said computer system. The packet switch router is subsequently used to logically implement a data pipe between the data source and the data sink. The system configures the data pipe to provide adequate bandwidth between the data source and the data sink such that a data transfer occurs smoothly and predictably. The data transfer is performed via the data pipe such that the data transfer proceeds independently of any simultaneous second data transfer in the packet switched router.

17 Claims, 13 Drawing Sheets

METHOD AND SYSTEM FOR SIMULTANEOUS HIGH BANDWIDTH INPUT OUTPUT

FIELD OF THE INVENTION

The present invention pertains to a novel computer system programming paradigm which provides extremely high bandwidth. More particularly, the present invention relates to a method and system for a simultaneous high bandwidth point to point switching function which allows simultaneous point-to-point communications between multiple devices of a computer system without traversing memory of the computer system.

BACKGROUND OF THE INVENTION

In the past, computers were primarily applied to processing rather mundane, repetitive numerical and/or textual tasks involving number-crunching, spread sheeting, and word processing. These simple tasks merely entailed entering data from a keyboard, processing the data according to some computer program, and then displaying the resulting text or numbers on a computer monitor and perhaps later storing these results in a magnetic disk drive. However, today's computer systems are much more advanced, versatile, and sophisticated. Especially since the advent of digital media applications and the Internet, computers are now commonly called upon to accept and process data from a wide variety of different formats ranging from audio to video and even realistic computer-generated three-dimensional graphic images. A partial list of applications involving these digital media applications include the generation of special effects for movies, computer animation, real-time simulations, video teleconferencing, Internet-related applications, computer games, telecommuting, virtual reality, high-speed databases, real-time interactive simulations, medical diagnostic imaging, etc.

The reason behind the proliferation of digital media applications is due to the fact that much more information can be conveyed and readily comprehended with pictures and sounds rather than with text or numbers. Video, audio, and three-dimensional graphics render a computer system more user friendly, dynamic, and realistic. However, the added degree of complexity for the design of new generations of computer systems necessary for processing these digital media applications is tremendous. The ability of handling digitized audio, video. and graphics requires that vast amounts of data be processed at extremely fast speeds. An incredible amount of data must be processed every second in order to produce smooth, fluid, and realistic full-motion displays on a computer screen. Additional speed and processing power is needed in order to provide the computer system with high-fidelity stereo sound and real-time, and interactive capabilities. Otherwise, if the computer system is too slow to handle the requisite amount of data, its rendered images would tend to be small, grainy and otherwise blurry. Furthermore, movement in these images would likely be jerky and disjointed because its update rate is too slow. Sometimes, entire video frames might be dropped. Hence, speed is of the essence in designing modern, state-of-the-art computer systems.

One of the major bottlenecks in designing fast, high-performance computer systems pertains to the current bus architecture. A "bus" is comprised of a set of wires that is used to electrically interconnect the various semiconductor chips and input/output devices of the computer system. Electric signals are conducted over the bus so that the various components can communicate with each other.

FIG. 1 shows a typical prior art bus architecture 100. Virtually all of today's computer systems use this same type of busing scheme. A single bus 101 is used to electrically interconnect the central processing unit (CPU) 103 with the memory (e.g., RAM) 107 via controller 102. Furthermore, other various devices 104–106 are also coupled to bus 101. Bus 101 is comprised of a set of physical wires which are used to convey digital data, address information for specifying the destination of the data, control signals, and timing/clock signals. For instance, CPU 103 may generate a request to retrieve certain data stored in memory 102. This read request is then sent over bus 101 to memory controller 102. Upon receipt of this read request, memory controller 102 fetches the desired data from memory 107 and sends it back over bus 101 to the CPU 103. Once the CPU is finished processing the data, it can be sent via bus 101 for output by one of the devices 104–106 (e.g., fax, modem, network controller, storage device, audio/video driver, and the like).

The major drawback to this prior art bus architecture is the fact that it is a "shared" arrangement. All of the components 102–106 share the same bus 101. They all rely on a single bus to meet their individual communication needs. However, bus 101 can only establish communications between two of these devices 102–106 at any given time. Hence, if bus 101 is currently busy transmitting signals between two of the devices (e.g., device 105 and device 106), then all the other devices (e.g., memory 102, device 104, and CPU 103) must wait their turn until that transaction is complete and bus 101 again becomes available. If a conflict arises, an arbitration circuit, usually residing in memory controller 102, resolves which of the devices 102–106 gets priority of access to bus 101. Essentially, bus 101 is analogous to a telephone "party" line, whereby only one conversation can take place amongst a host of different handsets serviced by the party line. If the party line is currently busy, one must wait until the prior parties hang up, before one can initiate their own call.

Thus, CPU 103 competes for bus 101 bandwidth to access program instructions and data stored in memory 102. Each of devices 104, 105 and 106 need to compete for bus bandwidth to perform input output. Regardless of the speed of CPU 103, the limiting factor of the speed of computer system 100 is very often the bandwidth of bus 101, more particularly, the contention for bandwidth to access memory 107. Historically, bus traffic proceeded to and from memory 102 due to the fact that most input output was performed either to or from memory 102. This input output competes with all other traffic (e.g., CPU 103) for access to memory 102.

In the past, this type of bus architecture offered a simple, efficient, and cost-effective method of transmitting data. For a time, it was also sufficient to handle the trickle of data flowing between the various devices residing within the computer system. However, as the demand for increased amounts of data skyrocketed, designers had to find ways to improve the speed at which bits of data can be conveyed (i.e., increased "bandwidth") over the bus.

One solution to the bandwidth problem was to increase the width of the bus by adding more wires. The effect is analogous to replacing a two-lane road with a ten-lane super freeway. However, the increase in bus width consumes valuable space on an already densely packed and overcrowded printed circuit board. Furthermore, each of the semiconductor chips connected to the bus must have an equivalent amount of pins to match the increased bus width for accepting and outputting its signals. These additional pins significantly increase the size of the chips. It becomes more difficult to fit these chips onto the printed circuit boards. Additionally, the practical limitation for cost effective chips and packages impose a physical restriction on the chip's overall size and its number of pins. Today's buses are typically limited to being 64-bits wide. In other words, 64 bits of data or address can be sent simultaneously in parallel over 64 separate wires. The next step of increasing the bus width to 128 bits wide has become impractical due to this added complexity.

Another solution to the bandwidth problem was to increase the rate (i.e., frequency) at which data is sent over the bus. However, the physics associated with implementing long sets of parallel wires with multiple loads produces a wide range of problems such as impedance mismatches, reflections, crosstalk, noise, non-linearities, attenuation, distortions, timing, etc. These problems become more severe as the bus frequency increases. Higher bus frequencies cannot be attained without fine tuning, extremely tight tolerances, exotic micro-strip layouts, and extensive testing. It is extremely difficult to reliably mass produce such high frequency computers.

As such, applications written for these systems are structured to function around the bandwidth limitations of the system bus. The nature of data the applications transfer via the system bus is accordingly dictated by the bandwidth constraints of the system bus. As a result, there are very few full motion 3D simulation applications written for desktop systems. In the 3D applications that do exist, the realism and richness of 3D applications are greatly simplified in order to reliably and responsively run without slowing the computer system to a crawl. Tomorrow's applications will be rich 3d simulations. They will include extensive video manipulation by the computer system's processor. Multiple video streams, digital synthesis, digital audio are a few of the many applications envisioned. Given a 64-bit bus running at 66 MHz, the highest attainable data rate for a typical computer system is 524 Mbytes per second. Although this data rate appears adequate, it is rapidly becoming insufficient in light of the demands imposed by tomorrow's new applications.

Thus, what is required is a method and system which effectively provides for greatly increased system bus bandwidth. What is required is a method and system which accommodates the enormous bandwidth requirements of digital video, digital audio, 3d graphics, real-time compression and decompression, and the like. What is further desired is a method of servicing the bandwidth requirements of the above applications while conserving memory bandwidth. The required system should provide for a new programming paradigm wherein application designers are not limited by system bus bandwidth constraints. The required system should also allow one set of code to execute on both a new high bandwidth computer system and on conventional computer systems. The method and system of the present invention provides a novel solution to the above requirements.

SUMMARY OF THE INVENTION

The present invention comprises a method and system for peer to peer input output. The present invention is implemented on a computer system having a processor and a packet switched router coupled to the processor. The peer to peer input output system of the present invention defines a data source corresponding to a first device coupled to the computer system. The system then defines a data sink corresponding to a second device coupled to said computer system. The packet switch router is subsequently used to logically implement a data pipe between the data source and the data sink. The system configures the data pipe to provide adequate bandwidth between the data source and the data sink such that a data transfer occurs smoothly and predictably. The data transfer is performed via the data pipe such that the data transfer proceeds independently of any simultaneous second data transfer in the packet switched router.

In this manner, data is transferred directly from one device to another without impacting simultaneous data transfers in the system. Since each data pipe functions independently, data transfers between the processor and the memory of the computer system are not adversely impacted, thereby conserving critical processor to memory bandwidth. This allows the computer system to satisfy the bandwidth requirements of input output intensive applications, such as digital video and 3D graphics, and still run software applications near top speed.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Figure 1:
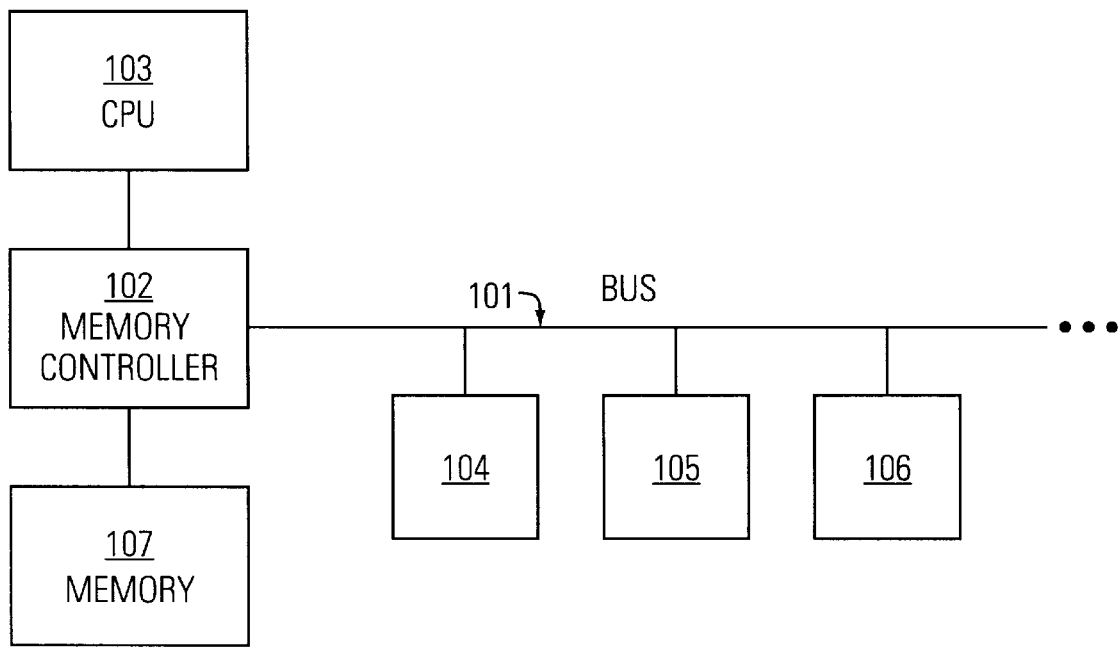
FIG. 1 shows a typical prior art bus architecture used in most computer systems.

In the following detailed description of the present invention, a method and system for efficiently drawing subdivision surfaces, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "implementing" or "transferring" or "executing" or "defining" or "storing" or "utilizing" or "describing" or the like, refer to the action and processes of a computer system (e.g., computer system 700 of FIG. 13), or similar electronic computing device, that manipulates and transforms data represented as physical (electronic) quantities within the computer system's registers and memories into other data similarly represented as physical quantities within the computer system memories or registers or other such information storage, transmission or display devices.

The present invention comprises a method and system for peer to peer input output. The present invention is implemented on a computer system having a microprocessor and a packet switched router coupled to the microprocessor. The peer to peer input output system of the present invention defines a data source corresponding to a first device coupled to the computer system. The system then defines a data sink corresponding to a second device coupled to said computer system. The packet switch router is subsequently used to logically implement a data pipe between the data source and the data sink. The data pipe is configured to provide adequate bandwidth between the data source and the data sink such that a data transfer occurs smoothly and predictably. The data transfer is performed via the data pipe such that the data transfer proceeds independently of any simultaneous second data transfer in the packet switched router.

In so doing, the present invention provides a method and system which greatly increases memory bandwidth available to applications. The method and system of the present invention accommodates the enormous bandwidth requirements of digital video, digital audio, 3D graphics, real-time compression and decompression, and the like. The present invention is capable of servicing the bandwidth requirements of each of the above applications while conserving critical processor to memory bandwidth.

Thus, the present invention provides for a completely new programming paradigm wherein future applications can be designed and written free from the constraints of severely limited memory bandwidth. Applications written in accordance with the system of the present invention need not be handicapped by the bandwidth limitations of the memory system. Such applications are limited by only the imagination and skill of the programmers and the capability of the computer system's hardware, rather than system bus bandwidth constraints.

The system of the present invention will lead to a greatly increased number of new "high bandwidth applications" written for desk top systems, e.g., real time 3D simulations. Very richly detailed and very realistic 3D simulations will reliably and responsively run without greatly slowing the computer system. For example, the system of the present invention will allow extensive video manipulation by the computer system's processor, while simultaneously inputting or outputting multiple video streams using digital synthesis and digital audio. The peer to peer input output system of the present invention and its benefits are described in greater detail below.

Figure 2:
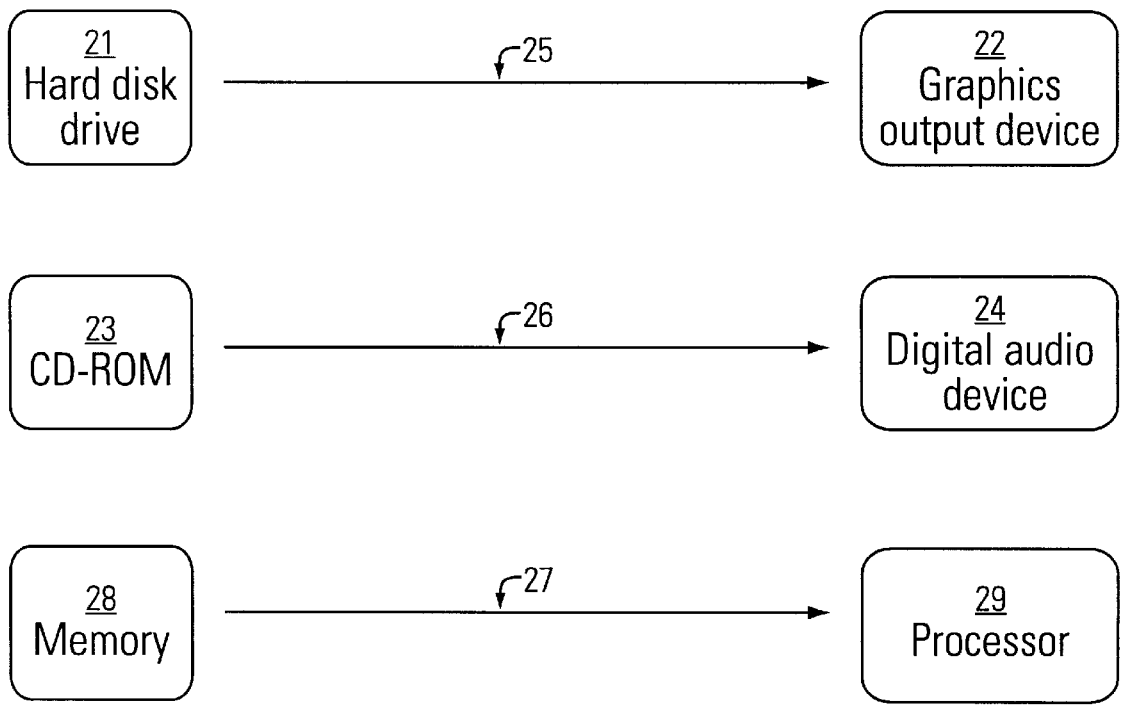
FIG. 2 shows a diagram of the peer to peer input output method of the present invention.

FIG. 2 shows the peer to peer input output scheme of the present invention. A "data source" 21 represents a raw video file stored on a hard disk and "data sink" 22 represents the video buffer of a graphics output device. A second data source 23 represents a compressed audio file stored on a CD in a CD-ROM. A second data sink 24 represents a digital audio device coupled to the computer system. The present invention provides a method and a system for simultaneously transferring data from data source 21 and data source 23 to data sink 22 and data sink 24. This is represented by line 25 and line 26 respectively. Thus, in accordance with the present invention, data transfer 25 and data transfer 26 occur simultaneously.

In the present embodiment, a data source refers to a device included in the computer system or coupled to the computer system (e.g., a hard disk) which transmits data to other devices included in or coupled to the computer system. Similarly, a data sink refers to a device included in the computer system or coupled to the computer system which receives data. These hardware devices can be "bus masters" and/or "bus slaves". A bus master generates addresses and provides or receives data. A bus slave receives addresses and provides or receives data. If the data sink is a bus master, it reads (i.e., pulls) data from the data source. Similarly, if the data source is a bus master, it writes (i.e., pushes) data to the data sink. Hence, many devices can act as either bus master or slave. Each data transfer (e.g., data transfer 25) has one bus master (e.g., hard disk drive 21) and one bus slave (e.g., graphics output device 22).

Referring still to FIG. 2, a data transfer from memory 28 to the computer system's processor 29 is represented by line 27. In prior art bus systems, data transfer 25 and data transfer 26 were exclusively multiplexed onto the prior art bus. Generally, data transfers 25 and 26 were each fragmented into a plurality of data segments and transferred in an alternating serial fashion, where each alternating data segment arbitrated for and "mastered" the prior art bus. This prevented a single data transfer from dominating the prior art bus. When either data transfer 25 or data transfer 26 mastered the prior art bus, it was unavailable for data transfer 27 between memory 28 and processor 29.

In attempting to conserve scarce bandwidth, data transfers via the prior art bus generally involved a transfer from an input device to memory 28 and then a transfer from memory 28 to an output device. These direct memory access (DMA) transfers further reduced the bandwidth available for data transfer 27. As a result, computer systems having prior art busses are much slower.

In contrast, the system of the present invention allows "peer to peer" input output without affecting memory 28. In peer to peer input output, any data source (e.g., data source 21) can transfer data to any data sink (e.g., data sink 22)

without regard to any contemporaneous data transfer (e.g., data transfer 26). Thus, video data from hard disk 21 can be transferred to graphics output device 22 directly (i.e., no DMA required, more particularly, no transfers into and out of memory 28 required). Data transfer 25 does not disturb or affect data transfer 26. In addition, it should be appreciated that neither data transfer 25 nor data transfer 26 affect memory 28. The system of the present invention executes data transfer 25 and data transfer 26 without impacting vital processor to memory bandwidth. In so doing, the present invention greatly increases the speed at which a computer system in accordance with the present invention can operate. This greatly increased speed provides a new programming paradigm wherein application designers are not limited by system bus bandwidth constraints.

Figure 3:
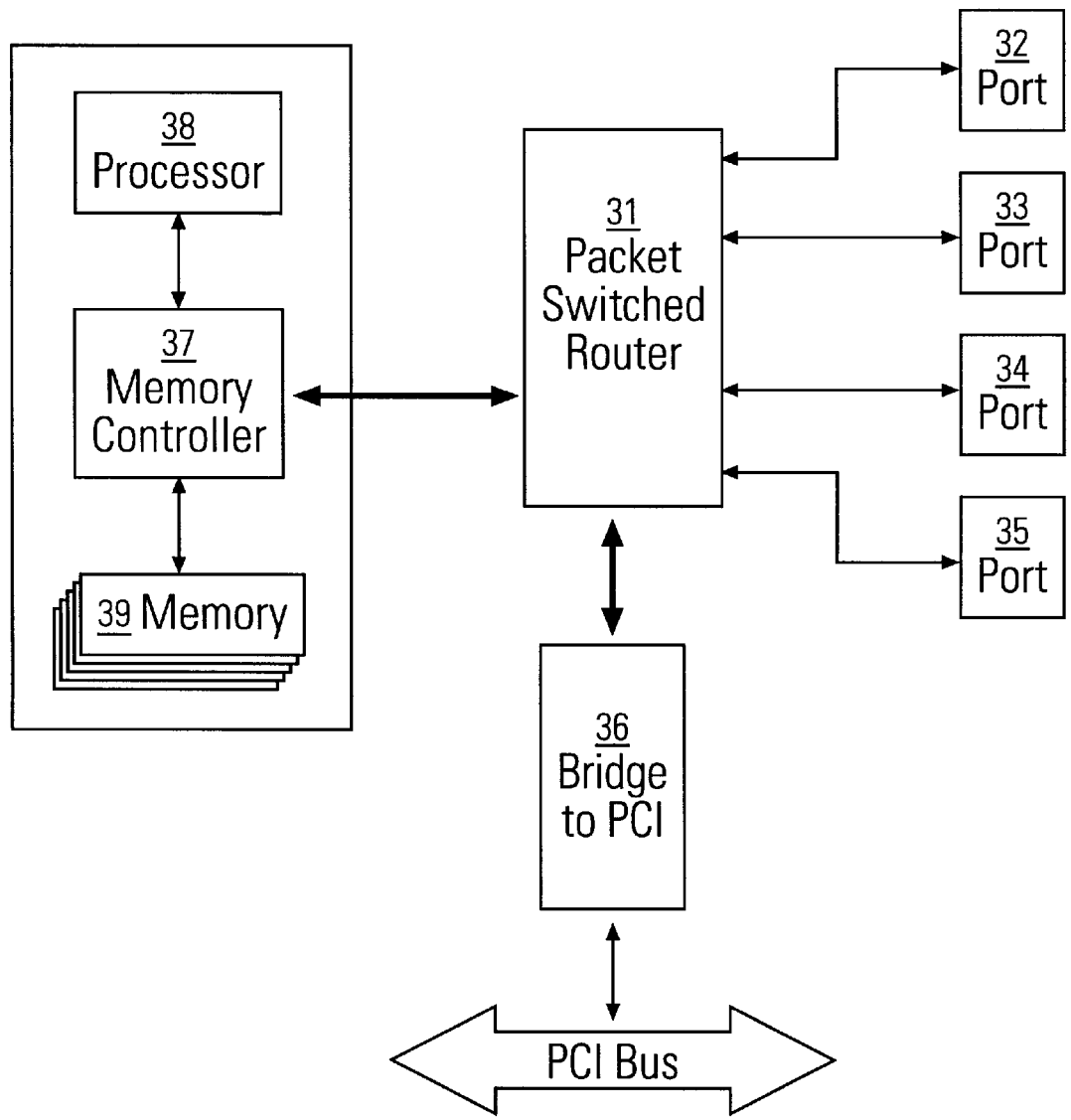
FIG. 3 shows a bus architecture in accordance with one embodiment of the present invention.

FIG. 3 shows a diagram of a bus architecture 30 in accordance with one embodiment of the present invention. The packet switched router 31 is coupled to a plurality of input output ports, port 32, port 33, port 34, and port 35 (hereafter ports 32–35). Each of ports 32–35 can accept a peripheral device, e.g., a hard disk drive, network adapter card, or video input device. In addition to ports 32–35, packet switched router 31 is coupled to an industry standard PCI expansion bus via bridge 36. Packet switched router is coupled to a memory controller 37. Memory controller 37 is coupled to a processor 38 and memory 39.

Bus architecture 30 enables peer to peer input output. Packet switched router 31 implements data transfers between ports 32–35, bridge 36, and memory controller 37. In the present embodiment, data transfers to and from processor 38 or memory 39 are implemented via memory controller 37. Bus architecture 30, to implement peer to peer input output, establishes concurrent data transfers between ports 32–35, bridge 36, and memory controller 37, by routing data packets through packet switched router 31. Packet switched router 31 allows any device coupled to any of ports 32–35 to communicate with memory controller 37, bridge 36, or any other device coupled to another of ports 32–35. Devices coupled to bus architecture 30 communicate with each other by sending data packets from an originating device to a destination device. For example, a device coupled to port 32 can communicate with a device coupled to port 34 by sending data packets addressed to port 34. Packet switched router 31 logically implements a communications link by routing the data packets from port 32 to port 34. This communications link is referred to as a "data pipe." In this manner, the device coupled to port 32 can directly communicate with any other device coupled to bus architecture 30.

Packet switched router 31 can simultaneously implement data pipes between a plurality of originating devices and destination devices. Packet switched router 31 is adapted to provide each implemented data pipe a dedicated high data transfer bandwidth. For example, in the present embodiment, each of ports 32–35 transfer data to and from the packet switched router 31 at approximately 1.6 GB per second. Hence, multiple high-speed data communications can occur simultaneously, thereby significantly increasing the overall system bandwidth of bus architecture 30.

Figure 4:
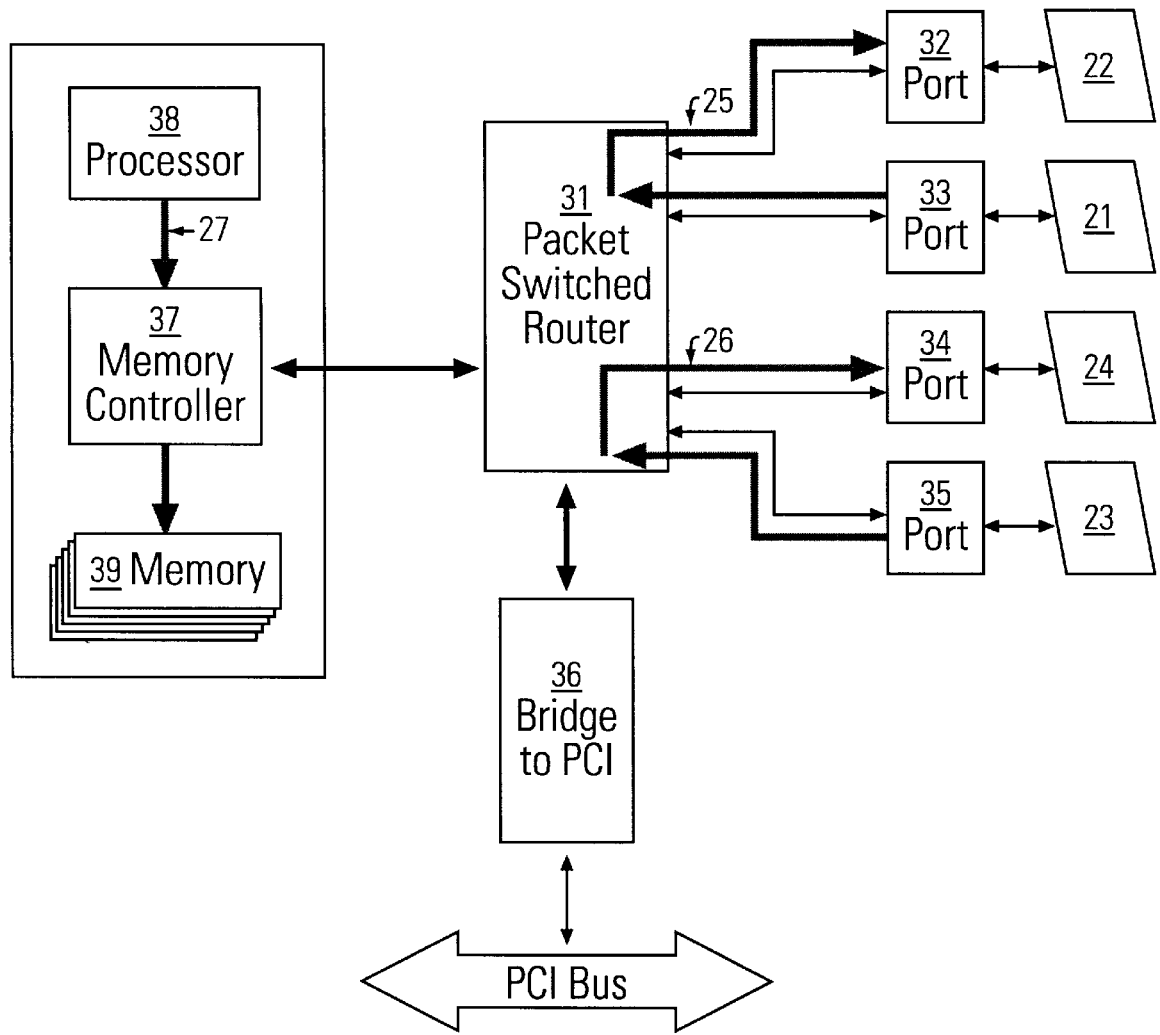
FIG. 4 shows the bus architecture from FIG. 3 performing a simultaneous peer to peer input output in accordance with one embodiment of the present invention.

Referring now to FIG. 4, a diagram of bus architecture 30 performing a simultaneous peer to peer input output in accordance with the present invention is shown. Port 32 is coupled to the graphics output device 22 from FIG. 2. Port 33 is coupled to hard disk drive 21. Port 34 is coupled to audio device 24 and port 35 is coupled to CD-ROM 23. As described above, graphics output device 22 and audio device 24 are both data sinks. Hard disk drive 21 and CD-ROM 23 are both data sources.

Packet switched router 31 implements data transfers between hard disk drive 21 and graphics output device 22 and between CD-ROM 23 and audio device 24 by logically implementing data pipe 25 and data pipe 26 respectively. Data packets from hard disk drive 21 are routed by packet switched router 31 to graphics output device 22 via data pipe 25 such that data pipe 25 realizes very high data transfer rates (e.g., upwards of 800 MB per second in each direction). Simultaneously, data packets from CD-ROM 23 are routed by packet switched router 31 to audio device 24 via data pipe 26 such that data pipe 26 independently realizes very high data transfer rates. Packet switched router 31 is adapted to provided each implemented data pipe a dedicated high data transfer bandwidth. In this manner, the bandwidth of data pipe 25 is independent of the bandwidth of data pipe 26.

It should be appreciated that data pipe 25 and data pipe 26 both function independently of all processor to memory traffic. Thus, the system of the present invention implements a mechanism enabling data pipe 25 and all of it's I/O traffic between ports 32 and 33 and data pipe 26 and all of it's I/O traffic between ports 34 and 35, without impacting vital processor 38 to memory 39 bandwidth. Data pipe 25 and data pipe 26 do not affect memory 39, and do not require traditional DMA for high performance.

Figure 5:
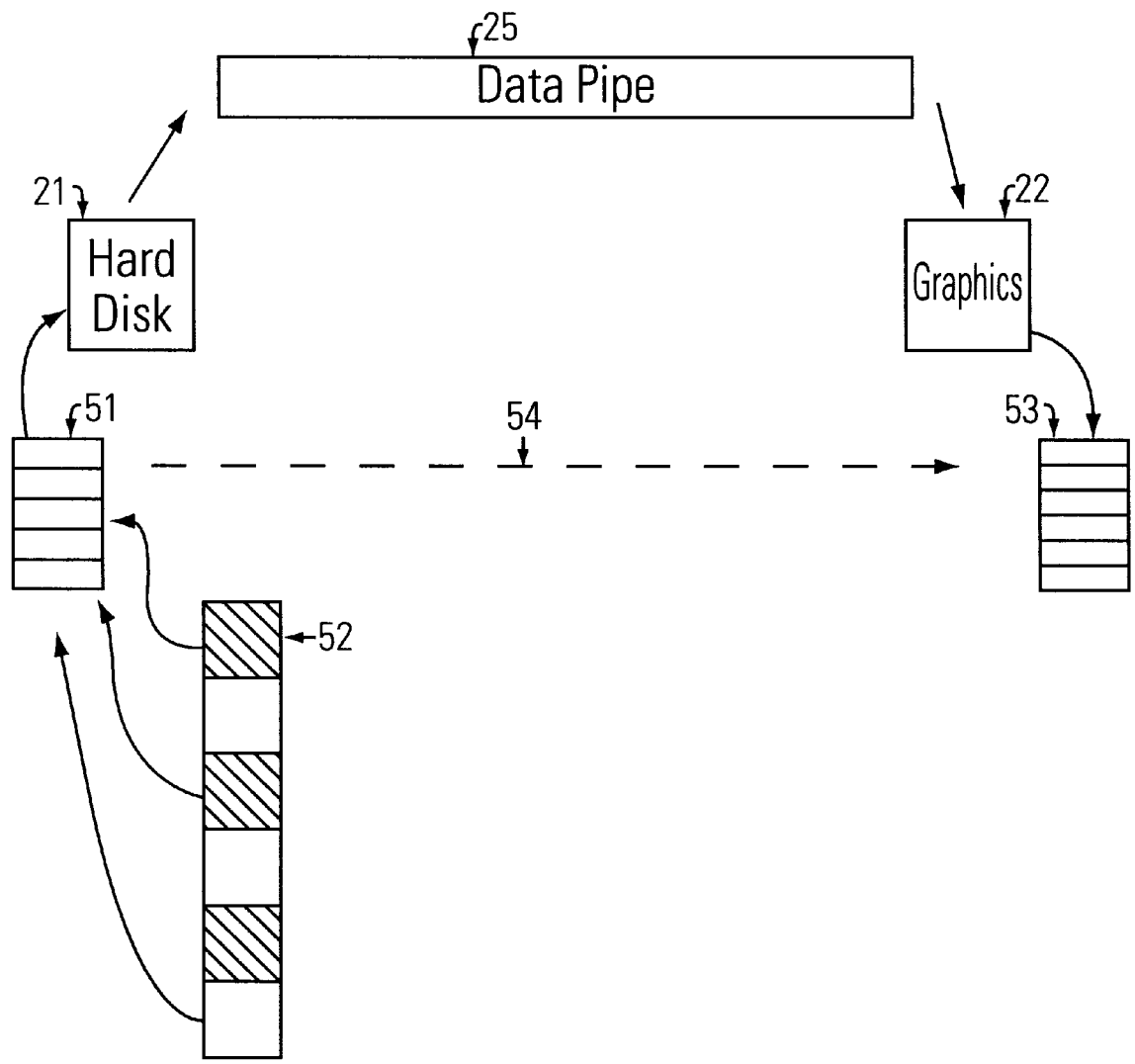
FIG. 5 shows a diagram of a peer to peer data transfer method.

FIG. 5 shows a block diagram of a peer to peer data transfer 50 in accordance with one embodiment of the present invention. In data transfer 50, the hard disk 21 is the data source and the graphics output device 22 represents the data sink. As discussed above, in the system of the present invention, the originating device of a data transfer is defined as the data source and the destination device is defined as the data sink. The data pipe 25 is a software abstraction controlling the packet switched router and associated hardware. The system of the present invention provides an application programming interface (API) to which software applications are written. An application written to the API can utilize the peer to peer input output capabilities of the present invention.

The API abstracts the process of transferring data from an originating device to a destination device. The API defines originating devices as data sources and gives them a set of common characteristics. The API defines destination devices as data sinks and likewise, gives them a respective set of common characteristics. In order to transfer data, the application specifies the characteristics of the "pipe ends" (i.e., the data source and the data sink). More particularly, a pipe end is a software abstraction of a data input or data output port coupled to a hardware device. The data pipe abstraction provides a general means of coordinating the flow of data from data source to data sink. All data source data sink combinations have a common set of responsibilities with respect to issues such as start-up, shut down, fatal error handling, and the like. In addition, many data source data sink combinations utilize software application specific functions such as soft error processing, timing synchronization, even or odd field, and the like. All of these requirements are supported by the data pipe abstraction of the present invention.

In the present embodiment, the respective characteristics of the pipe ends are comprised of file descriptors and/or device handles. The data source file descriptor describes the particular structure and nature of the data which is to be transferred from the data source. The data sink file descriptor describes the particular structure and nature in which the transferred data is to be stored or utilized when received by the data sink. In addition, the data source and data sink file descriptors provide information about the "type" of pipe end with which the system is working, where the type of pipe end implies data flow constraints, bandwidth limitations, and the like.

Thus, the software application creates a data source file descriptor 51 and a data sink file descriptor 53. The software then uses the source and sink to create the data pipe 25. In so doing, the actual process of transferring the data is abstracted, as represented by dashed line 54. The application leaves the specifics of the actual data transfer (i.e., the implementation of data pipe 25) to the system of the present invention. The API provides a method for data to be transferred directly from hard disk 21 to graphics output device 22. As discussed above, the data source file descriptor describes the data which is to be transferred. In data transfer 50, a data source file descriptor 51 describes particular frames of raw video data stored in a data structure 52 on hard disk drive 21. Data sink file descriptor 53 describes the nature in which the data is to be stored and utilized by graphics output device 22.

The data pipe is configured according to, among other things, the information contained in the data source file descriptor 51 and the data sink file descriptor 53. In this manner, the resources of the packet switched router can be configured to guarantee a specified amount of maximum latency and a specified amount of minimum data transfer bandwidth for data pipe 25. This is a major improvement over bus architectures of the prior art. It should be appreciated that the present invention will allow software application developers, for the first time, to configure the host computer system to manage and move large quantities of data with hardware latency and bandwidth guarantees. In this manner, the present invention provides for a completely new programming paradigm wherein future applications can be designed and written free from the constraints of severely limited system bus bandwidth. Applications written in accordance with the system of the present invention need not be handicapped by the bandwidth limitations of a computer system's bus. Such applications are limited by only the imagination and skill of the programmers and the capability of the computer system's hardware, rather than system bus bandwidth constraints.

The API of the present invention also provides for "backward compatibility". Once the data source file descriptor 51 and the data sink file descriptor 53 are created, the system of the present invention implements data pipe 25 in the manner discussed above and directly transfers the data on hard disk drive 21 as specified by the data source file descriptor 51 to graphics output device 22. The data is stored and utilized by graphics output device 22 as specified by data sink file descriptor 53. By abstracting the implementation specific details of a peer to peer data transfer, the API allows the utilization of one set of software code which allows the application including the code to run on different computer systems, for example, computer systems not equipped with the packet switched router of the present invention.

Figure 6:
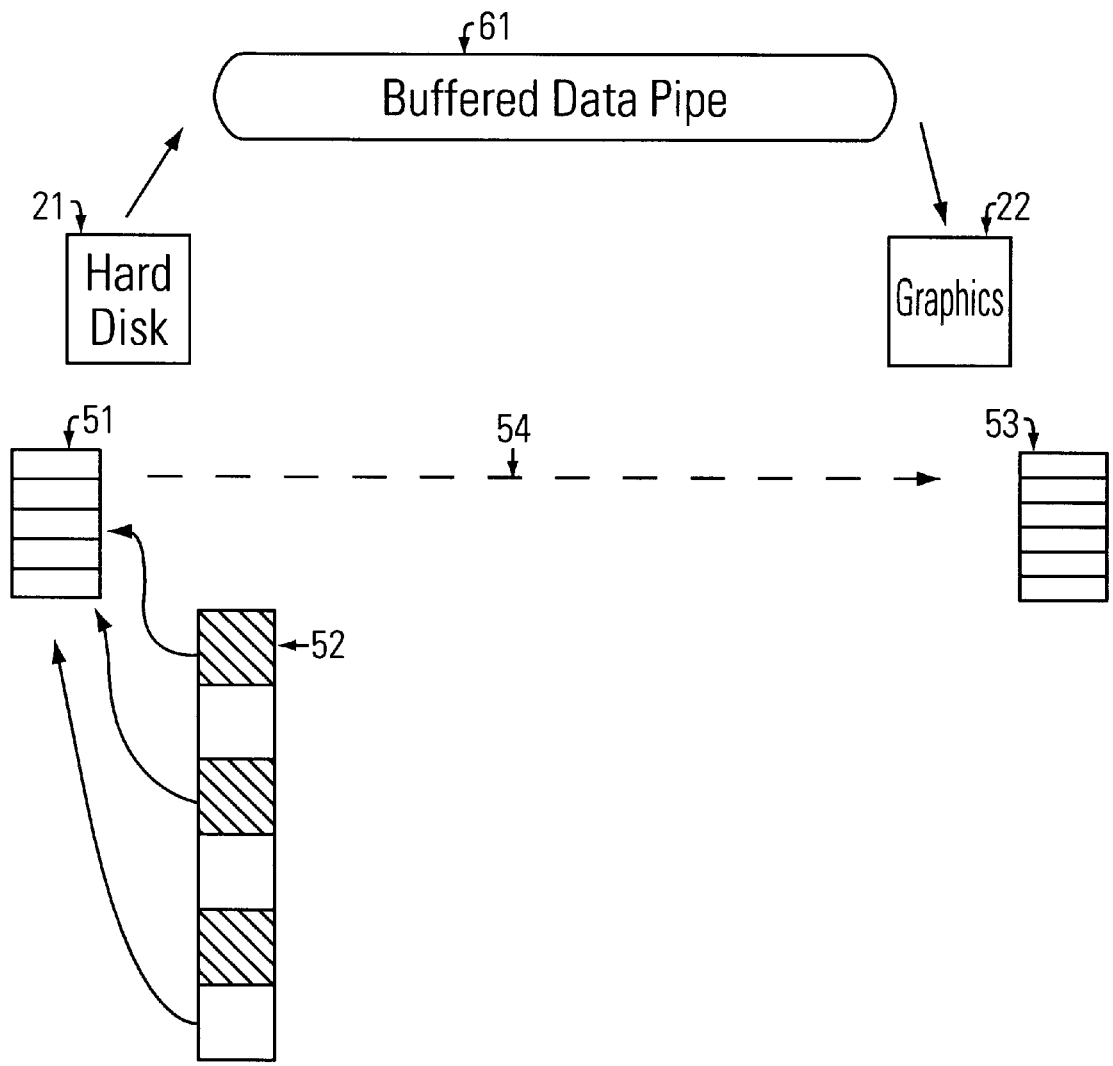
FIG. 6 shows a diagram of a buffered peer to peer data transfer method.

FIG. 6 shows a block diagram of a buffered peer to peer data transfer 60 in accordance with one embodiment of the present invention. The buffered peer to peer data transfer (hereafter buffered data transfer) is used where an application written to the API of the present invention is running on a conventional computer system. The conventional computer system has a conventional bus architecture (i.e., the computer system is not equipped with the packet switched router of the present invention). Traditionally, software written to an API for one computer architecture is would not run on a second different computer architecture without extensive porting and re-compilation. Software written to the API of the present invention, however, can also execute on conventional computer system architectures.

To run on conventional computer systems, the software of the present invention emulates a data pipe by using DMA type buffers in the memory of the computer system. This is easily accomplished due to the fact that the present invention abstracts the implementation specific details of peer to peer data transfer, as described above. In buffered data transfer 60, the present invention utilizes buffered data pipe 61 in place of the data pipe 25 of FIG. 5. Instead being a logically implemented data pipe in a packet switched router (e.g., packet switched router 31 of FIG. 4), buffered data pipe 61 is a software created and maintained data structure in the memory of the conventional computer system. The data source file descriptor 51 and the data sink file descriptor 53 are created in the manner described above. The data source file descriptor 51 and the data sink file descriptor 53 are utilized to configure a buffered data pipe in the memory of the conventional computer system. The data on the hard disk drive 21, is subsequently transferred via the buffered data pipe 61 to graphics output device 22.

In so doing, the data specified by file descriptor 51 is transferred to the buffered data pipe in memory. The data is subsequently transferred to graphics output device 22 where it is stored and utilized as specified by data sink file descriptor 53. Transfers via the buffered data pipe 61 hence resemble conventional DMA type data transfers. Buffered data transfer 60 thus allows software written to take advantage of the peer to peer data transfer capabilities of the present invention to still run on conventional computer systems. The API allows software designers to write one set of code which will execute on conventional computer systems as well as on computer systems in accordance with the present invention, even though conventional computer systems cannot provide the speed advantages of computer systems in accordance with the present invention.

Figure 7:
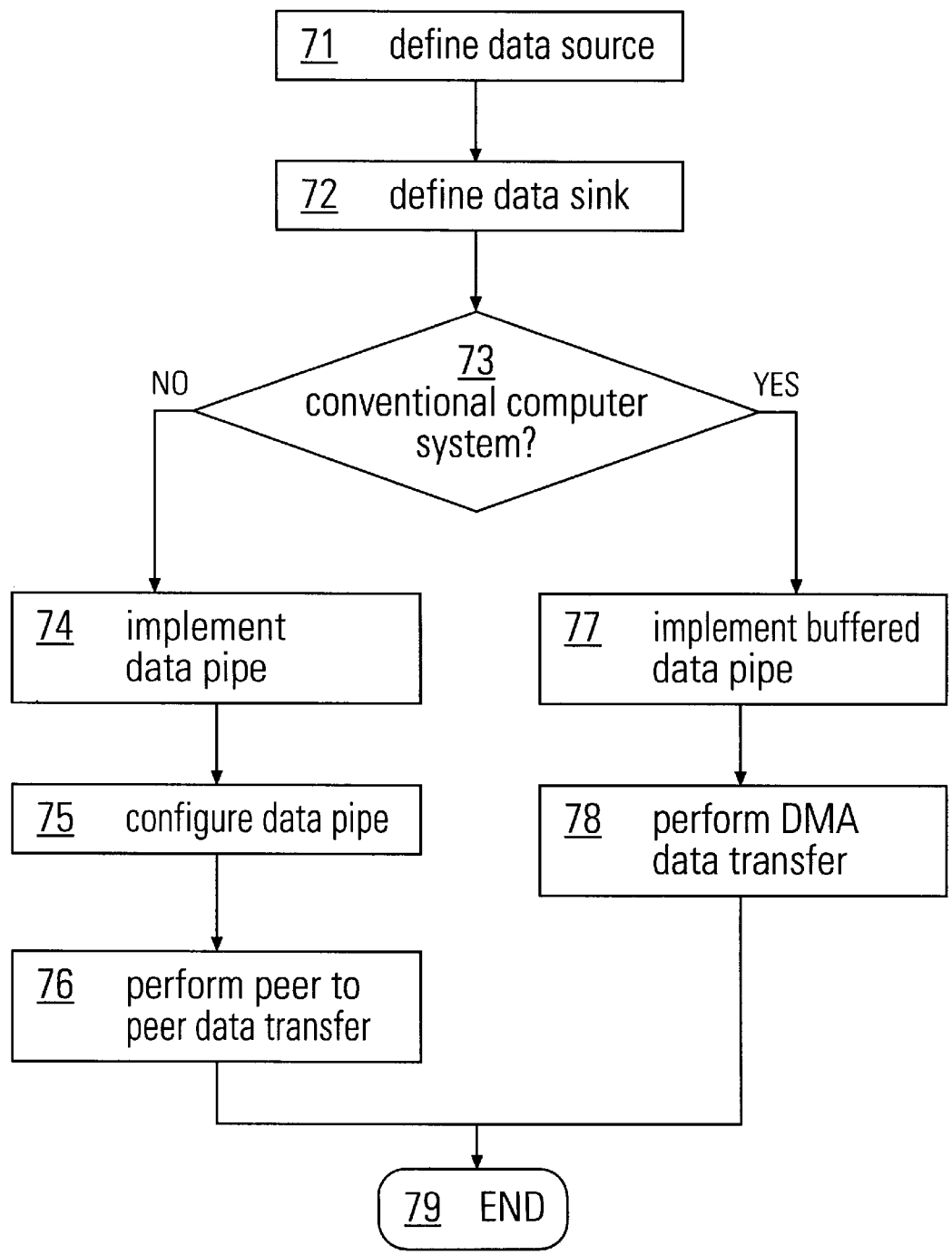
FIG. 7 shows a flow chart of the steps of a method in accordance with the present invention.

FIG. 7 shows a flow chart of the steps of a method 70 in accordance with one embodiment of the present invention. The method 70 begins in step 71 where an application in accordance with the present invention defines a data source. The originating device of a peer to peer data transfer is defined as the data source. A data source descriptor file is created by the application. The data source descriptor file describes the particular structure and the nature of the data which is to be transferred. In step 72, the application defines a data sink. The destination device of the peer to peer data transfer is defined as the data sink. In a similar manner, the application creates a data sink descriptor file. The data sink descriptor file describes the particular structure and nature in which the transferred data is to be stored or utilized when received by the data sink. As described above, the data source descriptor file and the data sink descriptor file are together referred to as the pipe ends and are used to implement a data pipe.

In step 73, the system of the present invention determines whether it is hosted on a conventional computer system having a conventional bus architecture or on a computer system having a packet switched router in accordance with the present invention. When the present invention is hosted on the computer system having the packet switched router, the method 70 proceeds to step 74. In step 74, the system of the present invention logically implements a data pipe using the packet switched router. The implementation specific details of the data pipe are abstracted by an API, as described above. In step 75, the system of the present invention configures the data pipe based upon the information included in the pipe ends. The data pipe is configured to ensure adequate data transfer bandwidth. The data pipe functions independently in regard to any concurrent data pipe implemented in the packet switched router. In step 76, the peer to peer transfer is executed. Data packets from the originating device are addressed to the destination device. The data packets are routed from the originating device to the destination device via the data pipe implemented in the packet switched router. The method subsequently ends in step 79.

In step 73, when the present invention is hosted on the computer system having a conventional bus architecture, the method 70 proceeds to step 77. In step 77, the present invention implements a buffered data pipe. The buffered data pipe is implemented by emulates a data pipe by using DMA type buffers in the memory of the conventional computer system, as described above. The data source file descriptor and the data sink file descriptor are utilized to configure a buffered data pipe in the memory of the conventional computer system. In step 78, the present invention executes the data transfer via the buffered data pipe using DMA type transfers. In this manner, software written to take advantage of the peer to peer data transfer capabilities of the computer system having the packet switched router can still run on the conventional computer system. The method subsequently ends in step 79.

Thus, the present invention provides a method and system for greatly increasing system bus bandwidth. The present invention accordingly provides for the enormous bandwidth requirements of demanding applications such as digital video, digital audio, 3D graphics, real-time compression and decompression, and the like. Additionally, the present invention services the bandwidth requirements of these applications while conserving critical processor to memory bandwidth. The present invention provides a new API which allows one set of code to execute on computer systems in accordance with the present invention and on conventional computer systems. The specific hardware implementation details of the packet switched router of the present invention are discussed in greater detail in the section below.

Figure 8:
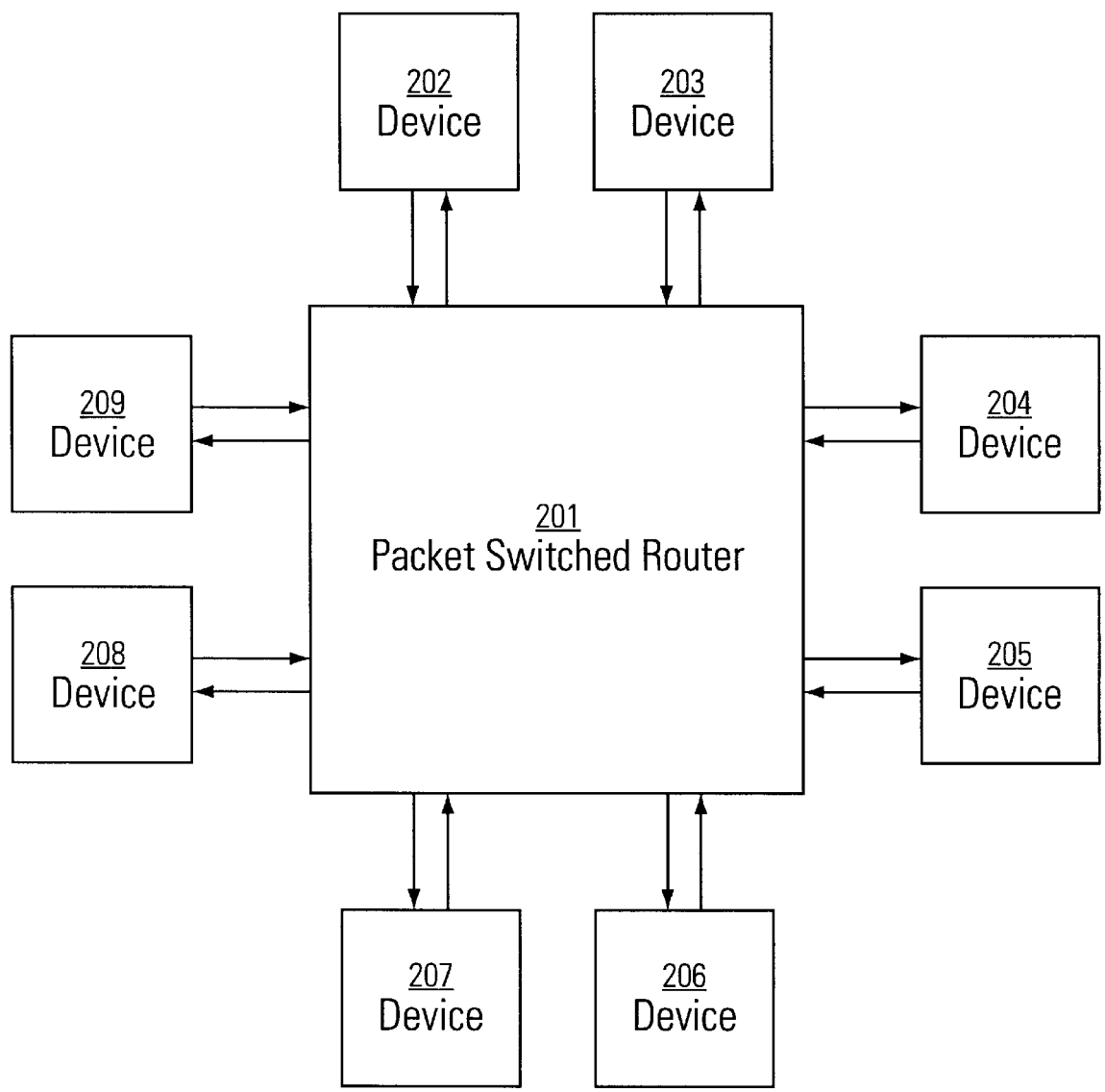
FIG. 8 shows a block diagram of one embodiment of the packet switched router architecture of the present invention.

FIG. 8 shows a block diagram of one embodiment of the packet switched router architecture according to the present invention. Multiple devices 202–209 are connected to a central packet switched router 201. Devices 202–209 may include subsystems (e.g., graphics, audio, video, memory, etc.), printed circuit boards, single semiconductor chips or chipsets (e.g., RAM, ASICs, CPU's, DSP's, etc.), and various other components (e.g., I/O devices, bridges, controllers, interfaces, PCI devices, etc.). Each of the devices 202–209 has its own dedicated transceiver for transmitting and receiving digital data. Eight such devices 202–209 are shown. Also as shown, packet switched router 201 has eight ports for interfacing with each of the eight devices 202–209. In the present embodiment, each port has the ability to operate as either a 16-bit or 8-bit port. However ports may be wider than 16 bits or narrower than 8 bits. Each port uses two links: one for transmit (source link) and one to receive (destination link). However, the system is scalable so that it can handle more or less devices. By adding more ports, additional devices may be incorporated into the computer system via the packet switched router 201. Each of these devices 202–209 has its own dedicated link. A link is defined as the physical connection from the packet switched router 201 to any of the devices 202–209. A link may be unidirectional or bi-directional. However, the currently preferred embodiment entails implementing point-to-point unidirectional connections in order to provide a controlled impedance transmission line. The data rate on each link is 400 MHz (2 bytes*400 MHz=800 megabytes per second in each direction=1.6 gigabytes per second per port).

Switched packet router 201 can be commanded to establish a link between any two designated devices. Thereupon, a source device may transmit its packet of data to the destination device via the link. Immediately after the packet is sent, a new link may be established and the source device may initiate transfer of another packet to a different destination device. Concurrently, a different source device may transmit its data packet over a separate link to its intended destination device. For example, device 202 can be linked to device 203. Device 202 transmits a packet to device 203. Later, packet switched router 201 can be commanded to establish a dedicated link between device 202 and device 203. A packet can then be transmitted from device 202 to 203. Basically, device 202 is capable of being linked to any of the other devices 203–209 coupled to packet switched router 201. In the present invention, one or more links may be established at any given time. For instance, a first link may be established between devices 202 and 209 while, simultaneously, a second link may be established between devices 203 and 205. Thereby, device 202 may transmit a packet to device 209. At the same time, device 203 may transmit its packet to device 205. With eight devices, there may be up to eight separate packet transmissions going at the same time. An additional 1.6 Gigabytes per second of bandwidth is achieved simply by establishing a second link. Hence, with the present invention, bandwidth is increased to the desired degree merely by establishing additional links. Thus, instead of having a shared bus scheme with only one communication over a shared party line, the present invention utilizes a packet switched routing architecture to establish multiple links so that multiple data packets can be conveyed concurrently.

Figure 9:
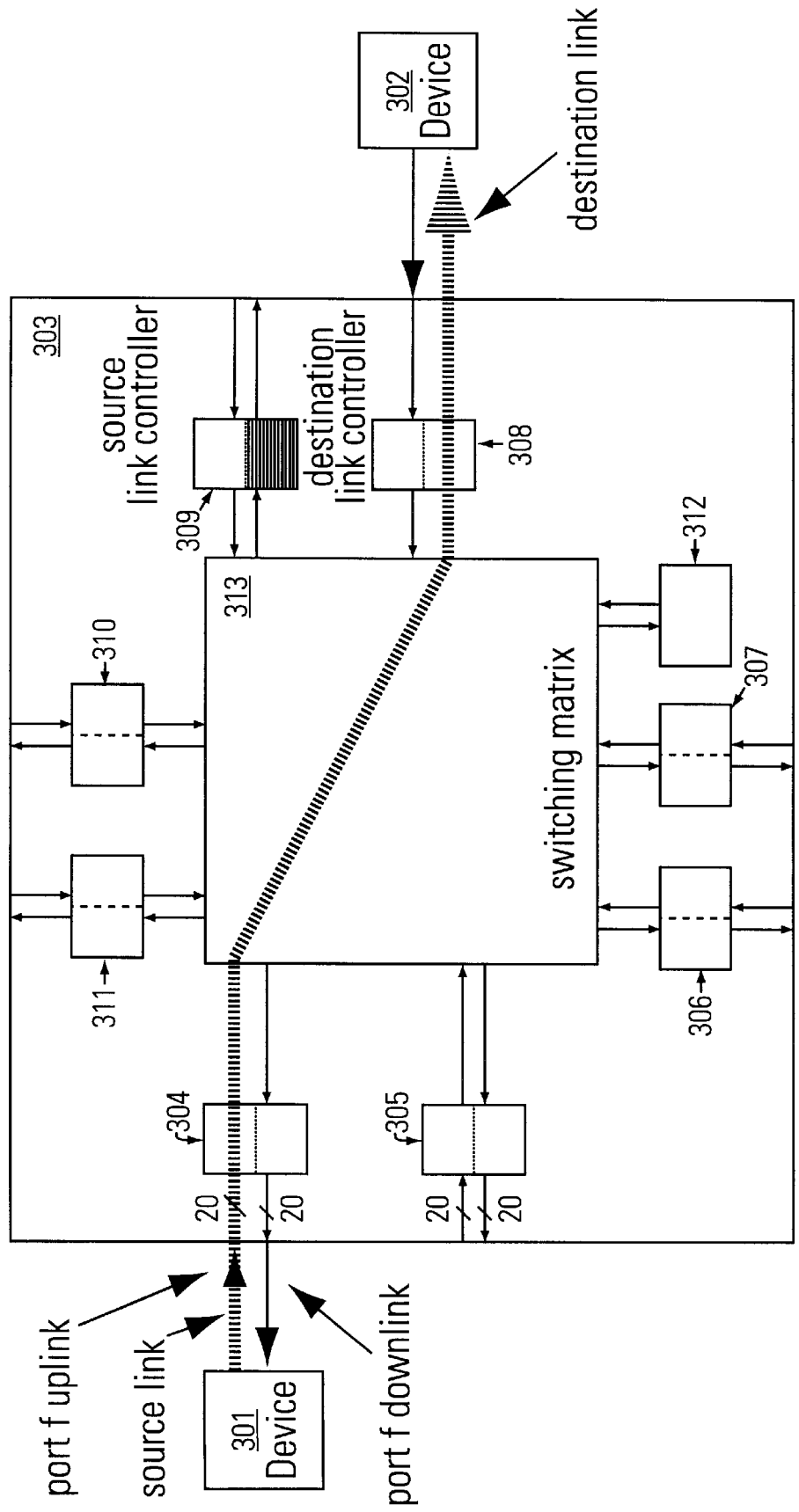
FIG. 9 shows a more detailed diagram of the fundamental blocks associated with the packet switched router of the present invention.

FIG. 9 shows a more detailed diagram of the fundamental blocks associated with the packet switched router. The currently preferred implementation of the architecture employs a high-speed, packet-switched protocol. A packet of data refers to a minimum unit of data transfer over one of the links. Packets can be one of several fixed sizes ranging from a double word (i.e., 8 bytes) to a full cache line (i.e., 128 bytes) plus a header. The data packets are transmitted source synchronous (i.e., the clock signal is sent with the data) at rates of up to 800 Mbytes/sec for 16-bit links and up to 400 Mbytes/sec for 8-bit links. Split transactions are used to transmit data, whereby an initiator device 301 sends a request packet (e.g., read command or write command plus data) to a target device 302 which then replies with a response packet (e.g., read data or optionally a write acknowledgment). The packet switched router 303 performs the functions of a switching matrix. The device 301 desiring to transfer a packet to another device 302, first transfers the packet to its associated input packet buffer. Once the packet routing information has been correctly received, arbitration begins for the destination port resource 308. The packet is then stored until the corresponding source link controller 304 can successfully obtain access to the destination port resource 308. As soon as access is granted, the packet is transferred through the switching matrix 313 to the destination port resource 308, and is subsequently transferred to target device 302.

Hence, the major functional blocks corresponding to the packet switched router 303 include link controllers 304–311, an internal interface 312, and the switching matrix 313. The link controllers 304–311 handle all packet transfers on the link port between a device and the packet switched router. The link controllers 304–311 are comprised of two subblocks: the source link controller and the destination link controller. The source link controller controls all packet movement from a source link to the internal crossbar switch 313. Conversely, a destination link controller controls all packet movement from the packet switched router to the destination link. The switched router 313 is a nine port switch which connects the source link controllers to the destination link controllers. Additionally, one port on the switched router 313 is reserved for the internal interface 312. Internal interface 312 contains the interface to all registers internal to the packet switched router 303 and also functions in conjunction with the link controllers during error handling. Each of these major blocks are described in detail below.

Figure 10:
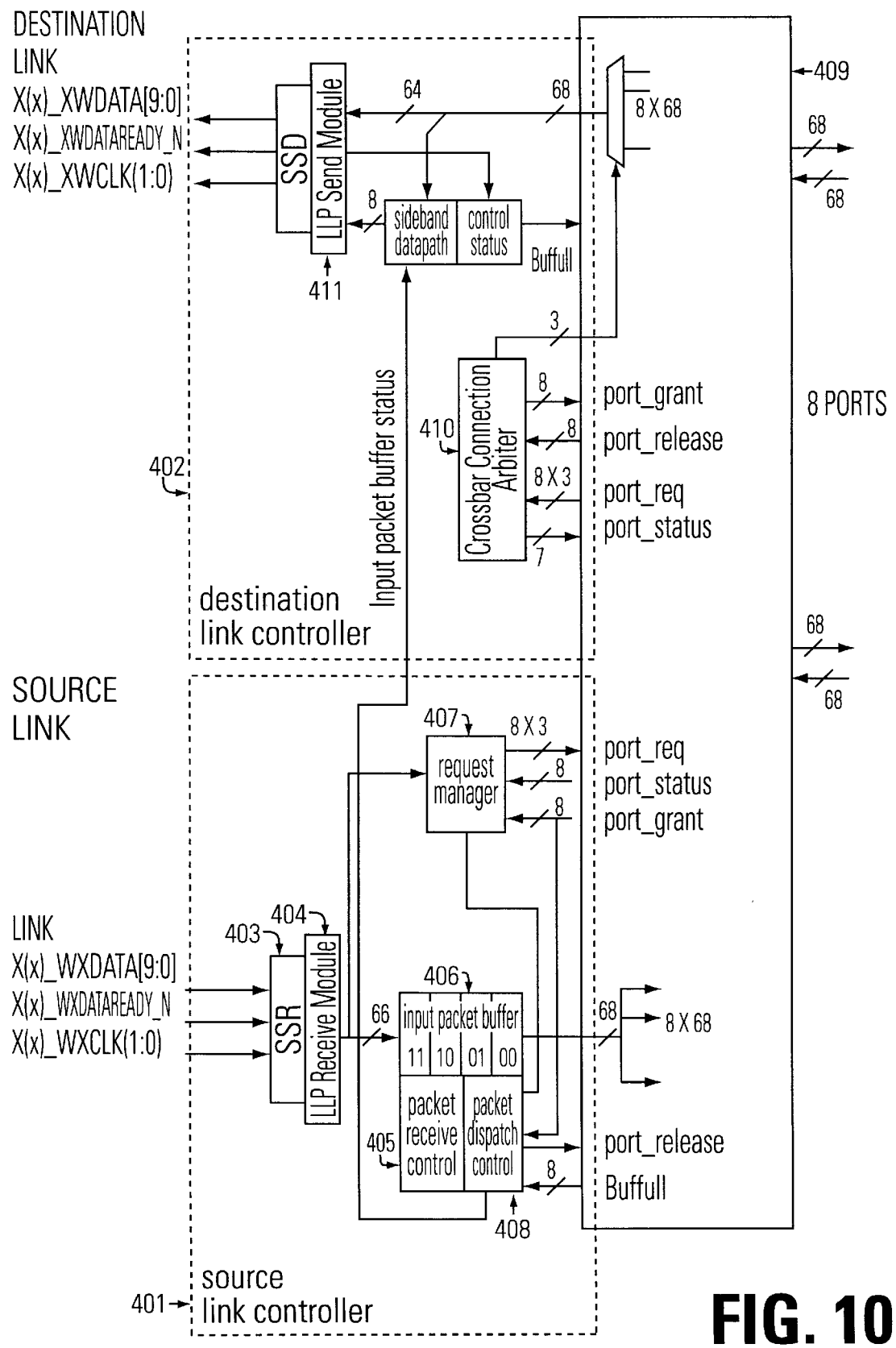
FIG. 10 shows a detailed circuit diagram of a link controller of the present invention.

FIG. 10 shows a detailed circuit diagram of a link controller. The link controller is divided into two sections, a source link controller 401 and a destination link controller 402. The source link controller 401 handles all traffic between the source link and the switching matrix 403. Packets are transferred on the source link and the data is received by the source synchronous receiver (SSR) 403 and link level protocol (LLP) receive module 404. The data is transferred in micropackets to ensure error-free transmission. Each micropacket contains 128 bits of data, 16 check bits, 4 bits of transmit sequence number, 4 bits of receive sequence number, and 8 bits of side band information. The SSR 403 receives the narrow, 400 MHz data stream and transmitted clock. It uses the clock signal to convert the data stream back into a wide, 100 MHz data stream. Hence, the majority of the packet switched router logic is isolated from the high speed links and operates at a 100 MHz core clock frequency. The LLP module regenerates the error check bits from the received data and compares them to the received check bits to ensure that no errors have occurred. The function of the LLP receive module 404 is to isolate the upper levels of logic in the link controller from the link level protocol. Basically, the SSR 403 and LLP receiver module 404 strips all link protocol information and passes the data to the next stages of logic.

Next, the packet receive control logic 405 scans the side band data for a "start of packet" code. If this code is received, the control logic 405 begins filling one of the 4-input packet buffers 406. The input packet buffers 406 serve two purposes. First, it provides a place to temporarily store a packet when the packet destination is busy. And second, it provides for rate matching between the data stream coming from the LLP and the switching matrix. The packet receive control logic 405 also extracts pertinent information from the command word portions of the packet and places it in the request queue, which is located in the request manager 407. The information written into the request queue defines the packet's destination, priority, and type (i.e., request or response). It is the task of the request manager to determine which packets are eligible for arbitration. While the packet is being received and put into one of the input packet buffers 406, the request manager 407 checks the status of the destination port and the priority of the packets in the queue to determine which of the packets in the input packet buffer 406 has the highest priority. If the packet which has just entered the queue has the highest priority of all packets currently in the queue, it will advance to the front of the queue and enter the arbitration phase. If there are higher priority connection requests already in the queue, it waits until those requests are serviced.

During the arbitration phase, the request manager 407 sends a connection request (port_req) to the destination link controller associated with that packet's destination. The request manager 407 then alerts the packet dispatch control 408 that a connection arbitration is in progress. When the packet wins arbitration, a port_grant signal is sent back from the destination link controller to the requesting source. Whereupon, the dispatch controller 408 begins transferring the packet out of the input packet buffer 406 and into the switching matrix 409. The request manager 407 then retires the entry from the request queue. As the dispatch controller 408 is transferring the packet, it also monitors whether the destination can currently accept any more data. When the transfer of the packet nears completion, the dispatch controller 408 releases control of the destination port by asserting the port_release signal. This releases the connection arbiter 410 to start a new arbitration phase and establish a new connection. Referring still to FIG. 10, the destination link controller 402 handles all packet traffic between the switching matrix and the destination link. In addition, it controls all access to the destination port via the connection arbiter 410. The connection arbiter 410 is responsible for selecting from among all the source link controllers requesting to establish a connection to its destination port. The arbiter 410 scans all current port_req signals and sends a port_grant signal back to the selected link source controller. It then updates the status of the destination port (port_status). As the port_grant acknowledge is sent, the connection arbiter 410 also schedules switching the switching matrix to coincide with the first data arriving at the destination port from the source link controller. A new arbitration cycle begins when the arbiter 410 receives a port_release signal from the source link controller.

Data is streamed directly from the switching matrix to the LLP Send Module 411. The LLP Send Module 411 contains an internal buffer which is used to perform two functions. First, a portion of this buffer is used for supporting the LLP sliding window protocol. As data is transferred over the link, it is also written into the buffer. If receipt of the data is acknowledged by the receiver, the buffer locations are cleared. However, if an acknowledgment is not received, the data is retransmitted. In normal operation with packets being received correctly, only a portion of the buffer is used to support this protocol. Second, the remaining location in the buffer is used to rate match between the 800 Mbyte/sec switching matrix 409 and the 400 Mbyte/sec 8-bit links. This buffering allows a 16-bit source link controller or an 8-bit source link controller that has accumulated a full packet, to transfer at the fill data rate to an 8-bit destination link. Thereby, the source link controller can then go service another destination while the transfer on the destination link is occurring.

A description of the internal interface is now presented. All access to internal registers in the packet switched router is performed via this internal interface. Devices requesting to modify these registers should direct their request packets to the internal interface destination. The internal interface functions much the same way as any set of link controllers. Source link controllers desiring to connect to the internal interface send a connection request to the internal interface. The arbiter within the internal interface sends an acknowledgment and then receives the packet. After the internal interface has received the packet it performs the appropriate operations on the packet switched router registers. If a response is required, the internal interface forms a response packet and transfers it back to the initiating device via the switching matrix.

Figure 11:
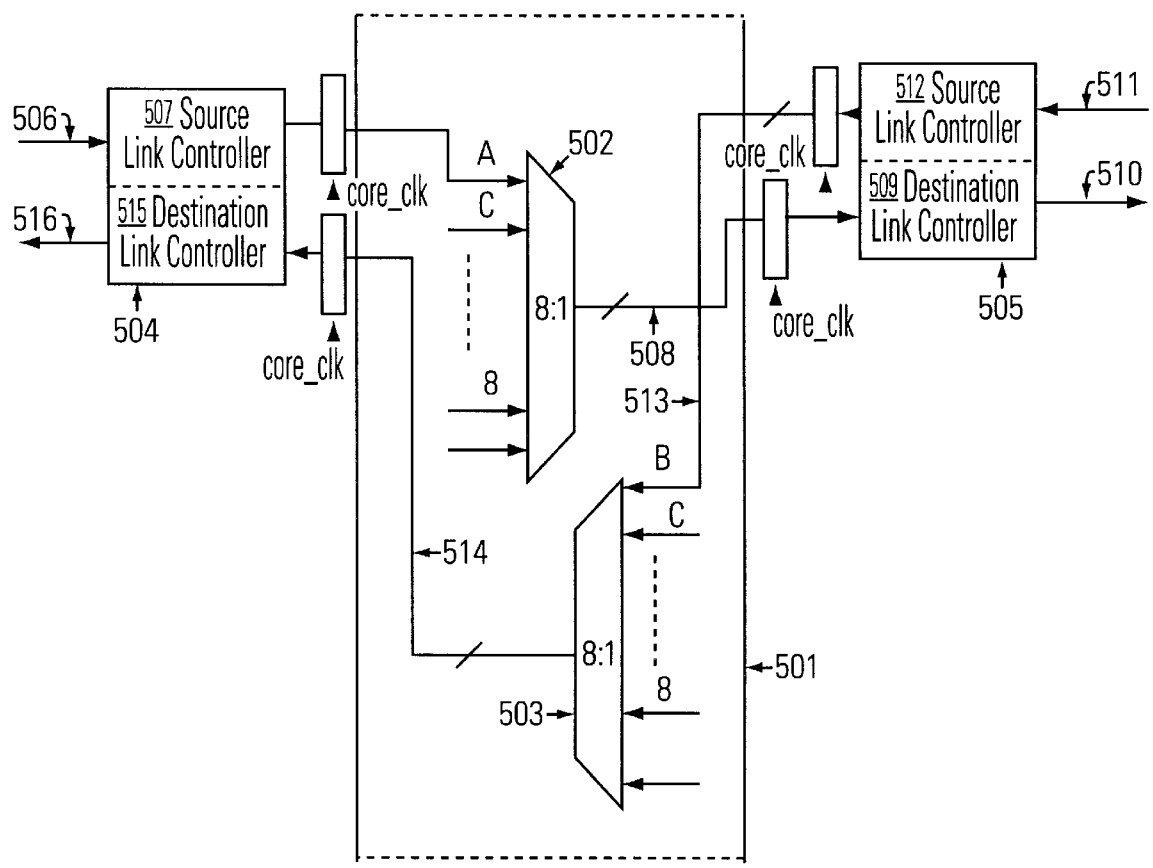
FIG. 11 shows a switching matrix of the preferred embodiment of the present invention.
Figure 12:
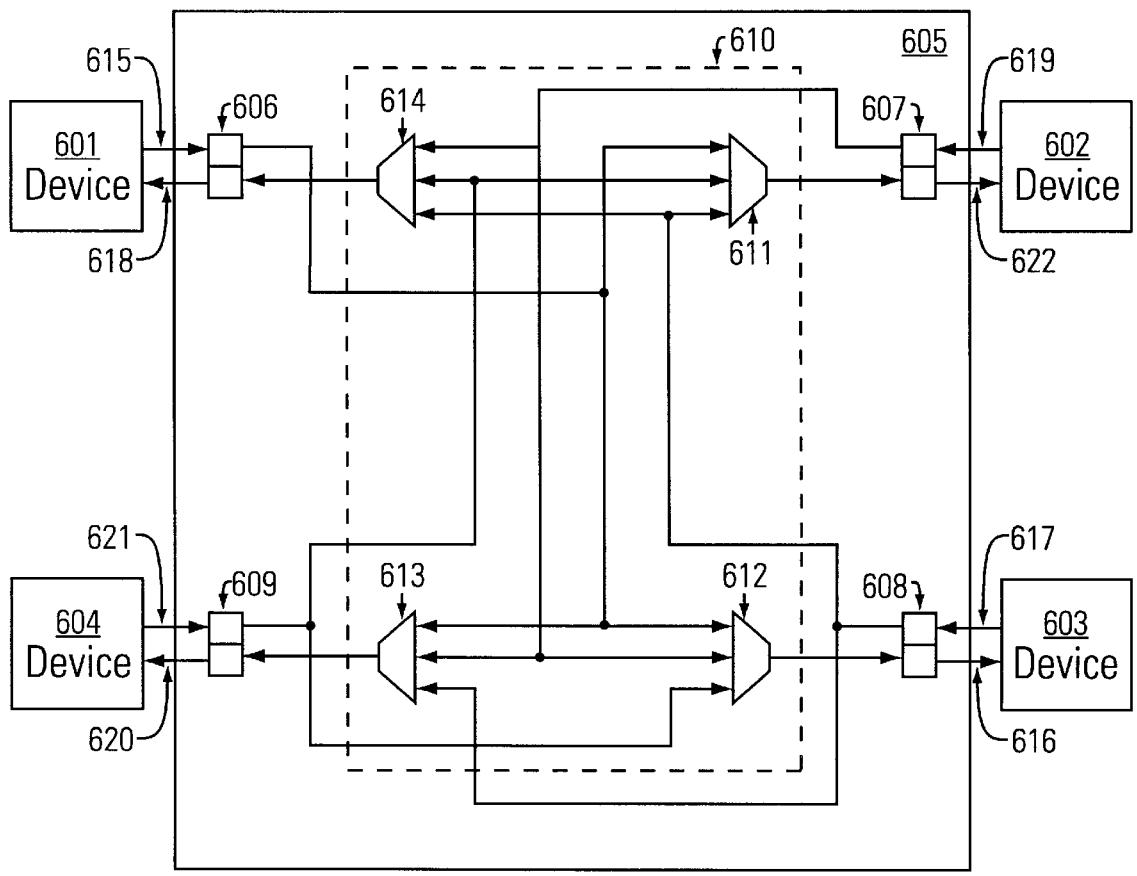
FIG. 12 shows an exemplary switched circuit for providing concurrent communications.

There are many different circuit designs which may be used to implement the switching matrix. The currently preferred embodiment for the switching matrix is shown in FIG. 11. The switching matrix 501 is comprised of nine 68-bit wide 8:1 multiplexers. Any of the source ports can be connected concurrently to any of the destination ports. The switch interconnect is traversed by data in one core clock cycle. Hence, it is necessary for source link controllers to drive the switching matrix with registered outputs and for the destination link controllers to register the data in. For purposes of illustration, a pair of these multiplexers 502 and 503 are shown for connecting a first link controller 504 to a second link controller 505. Data received on link 506 is passed through the source link controller 507 to line 520 as an input to multiplexer 502. Multiplexer 502 is commanded to select the appropriate input line to be connected to the output line 508. This causes the data to eventually be input to the destination link controller 509 and out to a port on link 510. Likewise, data on link 511 is input to the source link controller 512. The data is then processed by the source link controller 512 and sent as a input on line 513 to multiplexer 503. Multiplexer 503 is commanded to select the appropriate input lines 513 and establish a connection to the appropriate lines 514 for input to the destination link controller 515. Thereby, the destination link controller 515 processes the received data and sends it out to the destination port via link 516. It should be noted that multiple sets of inputs from each of link controllers are input to each of the nine multiplexers. Thereby, each multiplexer can select which of these multiple inputs is to be connected to its destination link FIG. 12 shows an exemplary switched circuit for providing concurrent communications. Four separate devices 601–604 are coupled to the packet switched router 605 through four pairs of links. Switched packet router 605 is comprised of four link controllers 606–609 and switching matrix 610. Switching matrix 610 is comprised of four multiplexers 611–614. Each of the multiplexers 611–614 accepts inputs from three source links and outputs to one destination link. These multiplexers can be commanded so that connections may be established from one particular device to any of the other three devices. For example, the output link from device 601 can be connected to destination device 602 via multiplexer 611; destination device 603 via multiplexer 612; or destination device 604 via multiplexer 613. Likewise, the output link from device 603 can be connected to destination device 601 via multiplexer 614; destination device 602 via multiplexer 611; or destination device 604 via multiplexer 613.

In addition, pathways may be established to provide multiple concurrent packet transmissions. For example, device 602 may be connected to device 604 via multiplexer 613. And device 603 may be connected to device 601 via multiplexer 601. Thereby three separate packets of data may be transmitted concurrently: packet1 from source device 601 to destination device 602, packet2 from source device 602 to destination device 604, and packet3 from source device 603 to destination device 601. In an alternative embodiment, connections may be established between a single source device and multiple destination devices. For example, device 601 may transmit data to both devices 603 and 604 simultaneously. Conversely, source devices 602, 603, and 604 may all send packets to 601. Arbitration is accomplished at link controller 606 for the multiple sources sending to device 601. Of course, the circuit can be scaled to accommodate additional devices by adding more links, link controllers, and multiplexers.

Figure 13:
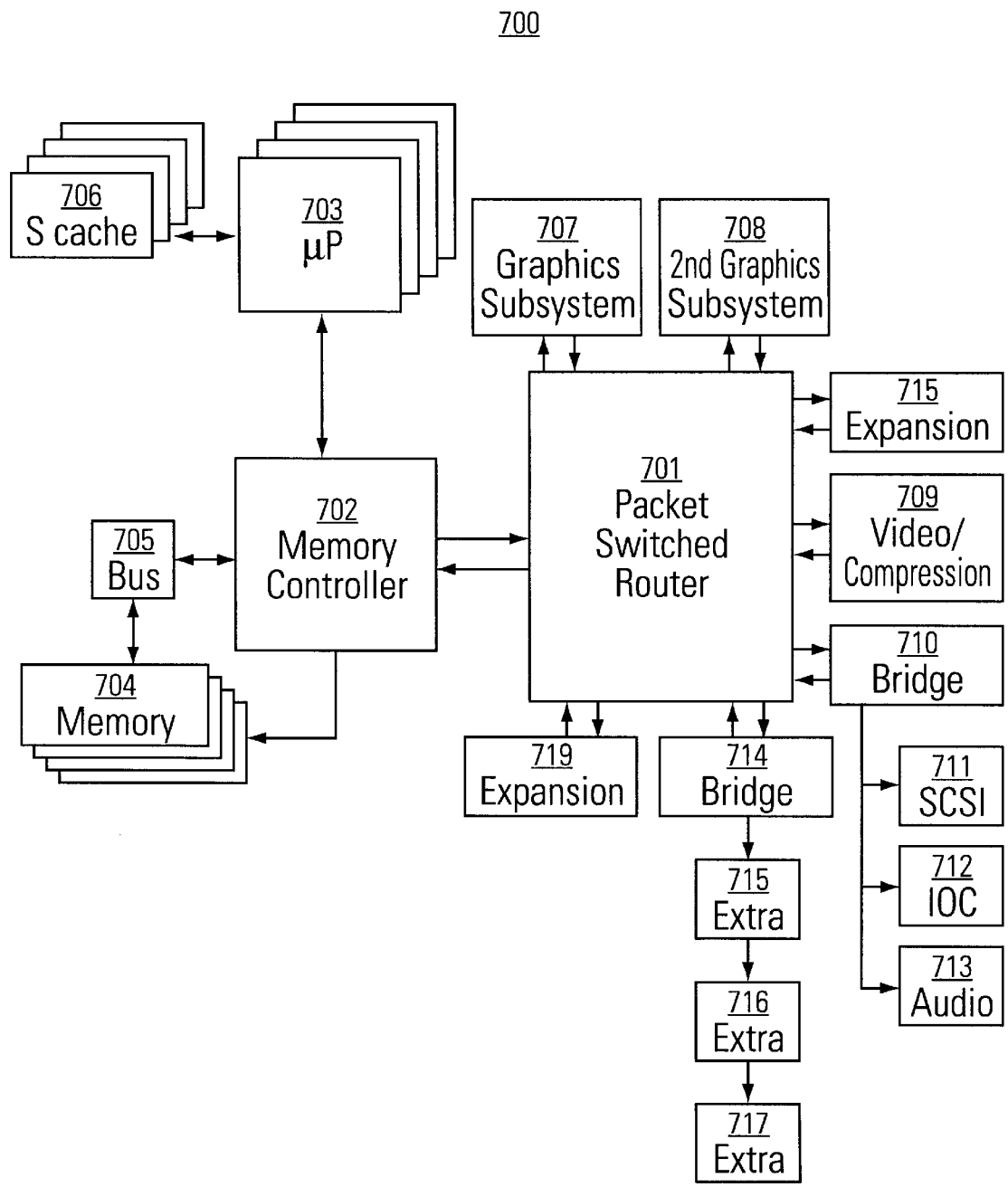
FIG. 13 shows one exemplary computer system incorporating the architecture of the packet switched router of the present invention.

There are many different computer system configurations to which the packet switched router architecture of the present invention may be applied. One such exemplary computer system 700 is shown in FIG. 13. Switched packet router 701 has a pair of direct point-to-point connections to memory controller 702. Memory controller 702 facilitates the transfer of data between one or more microprocessors 703 and memory 704. A high-speed (e.g., 1 GBytes/sec) memory bus 705 is used to couple memory controller 702 with the actual memory 704. To improve performance, the microprocessors 703 may temporarily cache data in the cache 706. Other devices which may be connected to packet switched router 701 include one or more graphics subsystems 707–708. The graphics subsystems 707–708 perform functions such as scan conversion, texturing, antialiasing, etc. Furthermore, a video board 709 having compression/decompression capabilities can be connected to packet switched router 701. A bridge device 710 may also be connected to packet switched router 701. The bridge 710 acts as an interface so that various off-the-shelf PCI devices (e.g., graphics controller, modems, disk controller, etc.) may be coupled to the computer system via standard SCSI 711, IOC 712 and audio 713 ports. A second bridge 714 may be added to provide expansion PCI slots 715–717. Ports 718 and 719 are used to provide future growth and upgradeability for the computer system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a computer system having a microprocessor, a computer implemented method for implementing peer to peer communications, the method comprising the computer implemented steps of:

a) defining a data source corresponding to a first device coupled to said computer system;

b) defining a data sink corresponding to a second device coupled to said computer system;

c) implementing a data pipe between said data source and said data sink, said data pipe logically implemented in a packet switched router included in said computer system, said packet switched router coupled to said first device and coupled to said second device, and creating a data sink file descriptor, wherein said data sink file descriptor describes data to be received by said data sink;

d) configuring said data pipe to provide adequate bandwidth to said data pipe between said first device and said second device for a data transfer; and e) performing said data transfer from said data source to said data sink via said data pipe such that said data transfer is independent of a simultaneous second data transfer in a second data pipe in said packet switched router between a third device coupled to said packet switched router and a fourth device coupled to said packet switched router and such that said data pipe transfers data independently with respect to said second data pipe implemented in said packet switched router.

2. The computer implemented method of claim 1, wherein step a) further comprises the step of:

creating a data source file descriptor, wherein said data source file descriptor describes data to be transferred from said data source.

3. The computer implemented method of claim 1, wherein step c) further comprises the step of:

implementing said data pipe using information included in said data source file descriptor and said data sink file descriptor.

4. The computer implemented method of claim 1, wherein step d) further comprises the step of:

configuring said data pipe to provide a specified amount of data transfer bandwidth between said first device and said second device using information included in said data source file descriptor and said data sink file descriptor.

5. The computer implemented method of claim 4, further comprises the step of configuring said data pipe to provide at least a minimum specified amount of bandwidth and no more than a maximum specified amount of latency for said data transfer.

6. The computer implemented method of claim 1, wherein step e) further comprises the step of performing said data transfer peer to peer without a direct memory access (DMA) transfer in said computer system, such that said data transfer does not impact a simultaneous transfer of data between said microprocessor and a memory included in said computer system.

7. The computer implemented method of claim 1, wherein step e) further comprises:

performing said data transfer by routing a plurality of data packets from said data source to said data sink via a packet switched router included in said computer system.

8. The computer implemented method of claim 1, further including the step of:

providing a software application programming interface (API) adapted to allow a software application written to said API to execute on said computer system including said packet switched router and on a conventional computer system without said packet switched router.

9. The computer implemented method of claim 8, farther including the steps of:

implementing a buffered data pipe in a memory included in said conventional computer system; and performing said data transfer via said buffered data pipe such that said data transfer occurs via a direct memory access (DMA).

10. In a computer system having a microprocessor and a memory coupled to a packet switched router, a computer implemented method for implementing a data transfer, the method comprising the computer implemented steps of:

a) implementing a data pipe between a data source and a data sink, said data pipe logically implemented in a packet switched router included in said computer system;

b) configuring said data pipe to provide adequate bandwidth for a data transfer via said data pipe, wherein said data transfer occurs between said data source and said data sink and creating a data sink file descriptor, wherein said data sink file descriptor describes data to be received by said data sink; and c) performing said data transfer from said data source to said data sink via said data pipe, said data transfer performed independently with respect to a concurrent data transfer in said packet switched router, said concurrent data transfer executed in a second data pipe implemented in said packet switched router between a second data source and a second data sink such that said data pipe transfers data independently with respect to said second data pipe implemented in said packet switched router.

11. The computer implemented method of claim 10, wherein step a) further comprises the steps of:

defining said data source such that said data source corresponds to a first device coupled to said computer system;

defining said data sink such that said data sink corresponds to a second device coupled to said computer system; and logically implementing said data pipe such that said data pipe couples said data source and said data sink.

12. The computer implemented method of claim 10, wherein step b) further comprises the steps of:

creating a data source file descriptor corresponding to said data source;

creating a data sink file descriptor corresponding to said data sink; and configuring said data pipe using information in said data source file descriptor and said data sink file descriptor.

13. The computer implemented method of claim 10, wherein step c) further comprises the steps of:

performing said data transfer by routing a plurality of data packets from said data source to said data sink via said data pipe such that said data pipe transfers data independently with respect to said second data pipe implemented in said packet switched router.

14. A computer system having a processor coupled to a packet switched router and a memory system coupled to the packet switched router, the memory for containing a set of instructions that when executed by the processor causes the computer system to implement a method of peer to peer data transfer, the method comprising the computer system performing the steps of:

a) implementing a data pipe between a data source and a data sink, said data pipe logically implemented in said packet switched router included in said computer system;

b) configuring said data pipe to provide adequate bandwidth for a data transfer via said data pipe, wherein said data transfer occurs between said data source and said data sink and creating a data sink file descriptor, wherein said data sink file descriptor describes data to be received by said data sink; and c) performing said data transfer from said data source to said data sink via said data pipe, said data transfer performed independently with respect to a concurrent data transfer in said packet switched router, said concurrent data transfer executed in a second data pipe implemented in said packet switched router between a second data source and a second data sink.

15. The computer implemented method of claim 14, wherein step a) further comprises the steps of:

defining said data source such that said data source corresponds to a first device coupled to said computer system;

defining said data sink such that said data sink corresponds to a second device coupled to said computer system; and logically implementing said data pipe such that said data pipe couples said data source and said data sink.

16. The computer implemented method of claim 14, wherein step b) further comprises the steps of:

creating a data source file descriptor corresponding to said data source;

creating a data sink file descriptor corresponding to said data sink; and configuring said data pipe using information in said data source file descriptor and said data sink file descriptor to provide a specified amount of data transfer bandwidth between said data source and said data sink.

17. The computer implemented method of claim 16, wherein step c) further comprises the steps of:

performing said data transfer by routing a plurality of data packets from said data source to said data sink via said data pipe.

\* \* \* \* \*